Patented Jan. 14, 1941

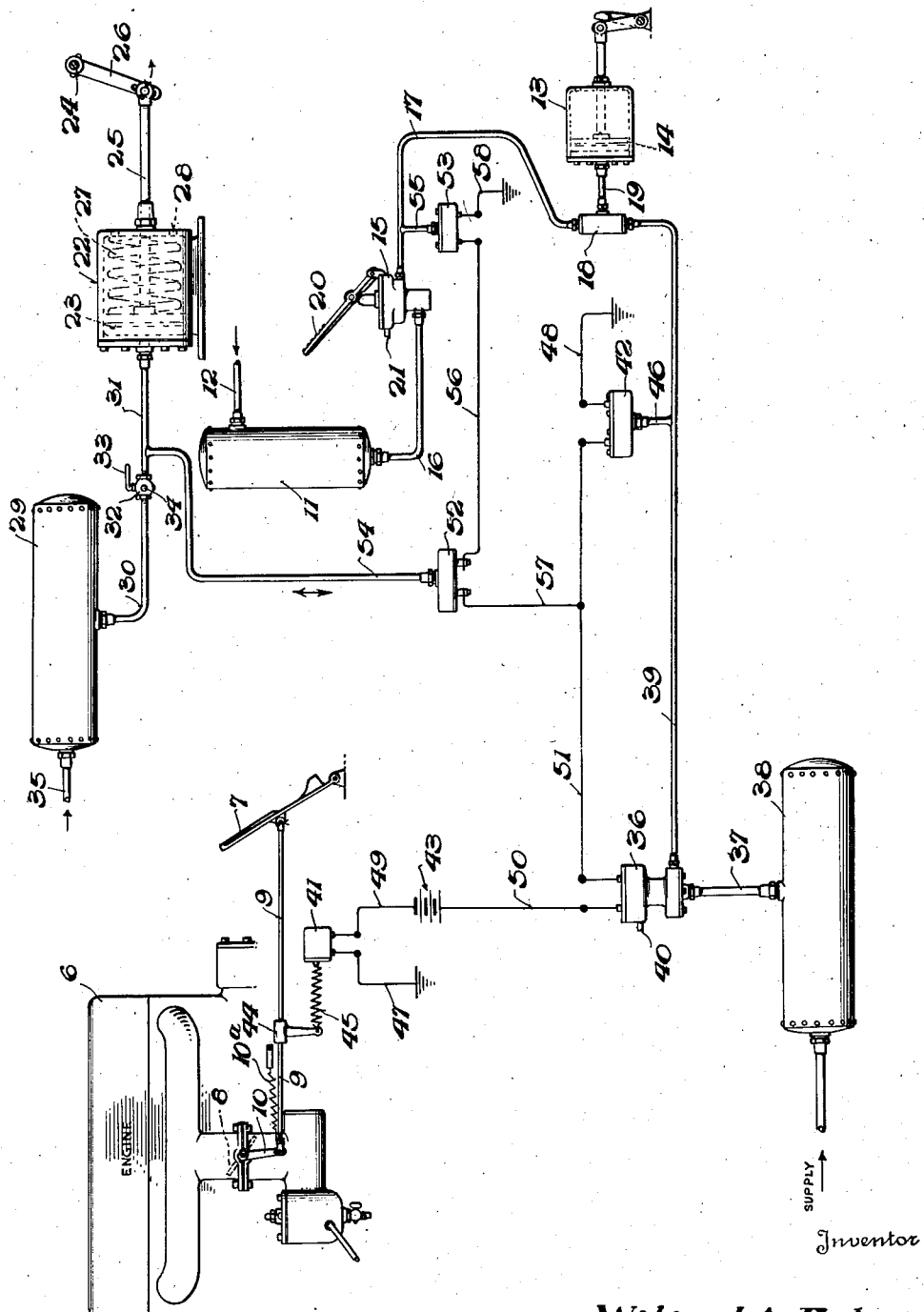

2,228,594

UNITED STATES PATENT OFFICE 2,228,594

CONTROL MECHANISM

Wilfred A. Eaton, Pittsburgh, Pa., assignor to Bendix-Westinghouse Automotive Air Brake Company, Pittsburgh, Pa., a corporation of Delaware Application July 13, 1939, Serial No. 284,377

10 Claims. (Cl. 192—3)

This invention relates to motor vehicle-controlling mechanism, and more particularly to a construction for interrelating the motor speed control, door control and brake systems.

One of the objects of the invention is to provide novel mechanism for holding the brakes applied when movement of the vehicle has been arrested and the vehicle door opened.

Another object is to provide, in a mechanism of the above character on a vehicle having service brake control mechanism, an auxiliary brake control mechanism controlled by manipulation of the service brake control mechanism, motor speed control system and door control system.

A further object is to provide auxiliary brake control mechanism in connection with service brake control mechanism whereby the auxiliary system is rendered ineffective during certain conditions of service brake control operation.

Yet another object is to provide mechanism controlled by predetermined operations of the service brake control, door control and motor speed control mechanisms for applying and holding the brakes applied, and controlled by operation of the motor speed control mechanism for releasing the brakes.

Still another object is to provide a structure of the above character wherein an auxiliary brake controlling mechanism may be electrically controlled in response to desired operations of the service brake, door, and motor speed control systems.

Other objects and novel features of the invention will appear more fully hereinafter from the following detailed description when taken in connection with the accompanying drawing. It is to be expressly understood, however, that the drawing is employed for purposes of illustration only and is not designed as a definition of the limits of the invention, reference being had for this purpose to the appended claims.

In the drawing, the single figure of which illustrates diagrammatically, certain parts being shown in section, a vehicle control mechanism constructed in accordance with the principles of the present invention, such mechanism is shown as applied to a motor vehicle of conventional type having a motor 6 for driving the vehicle and an accelerator 7 adapted to control the speed of the vehicle motor by virtue of its connection with throttle valve 8 through rod 9 and throttle lever arm 10. A spring 10ª connected to the throttle lever arm 10 assists in moving the accelerator to release position. In the illustrated embodiment of the invention, the vehicle is provided with a service brake system comprising a reservoir 11 adapted to receive fluid under pressure through a conduit 12 from a suitable compressor, not shown, but preferably driven by the vehicle motor, and a brake cylinder 13 having a piston 14 for operating the vehicle brakes and adapted to be supplied with fluid pressure from reservoir 11 under the control of a manually operable brake valve 15, the valve being connected to the reservoir 11 by a conduit 16 and to the brake cylinder by way of conduit 17, double check valve 18 and conduit 19. The brake valve is preferably of the selflapping type having an operating pedal 20 and serving, on depression of the pedal, to establish communication between conduits 16 and 17 for supplying fluid under pressure from reservoir 11 to the brake cylinder 13 for moving piston 14 to the right and applying the brakes, and serving, on release of pedal 20, to connect the brake cylinder with atmosphere through conduit 19, double check valve 18, conduit 17 and an exhaust port 21 provided in the brake valve. It is to be understood that the double check valve 18 is so constituted as to normally permit communication between conduits 17 and 19, as will be more fully explained hereinafter.

A door control system is provided having a fluid motor 22 adapted to operate a door of the vehicle, not shown, by means of a piston 23 connected to a door-operating shaft 24 through piston rod 25 and lever 26 operatively connected with the shaft, the parts described being normally maintained in door closing position by a spring 27 interposed between piston 23 and end wall 28 of the cylinder. The motor is operated by fluid pressure from a reservoir 29 connected thereto by conduits 30 and 31, a three-way valve 32 of conventional type having a valve control lever 33 and provided with an exhaust port 34 being interposed between said conduits and adapted with the control lever in the position shown to connect motor 22 with atmosphere through conduit 31, and adapted on movement of the control lever to another position to close the exhaust port and establish communication between conduits 30 and 31, thus permitting fluid to flow from reservoir 29 to the motor and open the vehicle door. It is to be understood that reservoir 29 may be connected to a compressor on the vehicle or to the other reservoirs through a conduit 35 in any convenient manner.

In order that the application and release of the vehicle brakes may be controlled in response to manipulation of the service brake and door control systems, additional brake control means are provided including an auxiliary brake valve 36, preferably of the electro-pneumatic type, this valve acting, when energized by connection in a suitable electrical circuit, to establish communication between a conduit 37 connected to a reservoir 38 and a conduit 39 connected to the double check valve 18, the latter acting in response to the admission of fluid under pressure to conduit 39 to establish communication between conduits 19 and 39 to permit fluid to flow to the brake cylinder 13, and acting at the same time to prevent communication between conduits 17 and 19, thus preventing the escape of braking fluid to atmosphere through conduit 17 and the exhaust port of service brake valve 15 when the latter is in release position. The auxiliary brake valve 36 is also provided with an exhaust port 40 and operates when deenergized to exhaust fluid from brake cylinder 13 through conduit 19, double check valve 18 and conduit 39.

When stopping the vehicle, and particularly when stopping on an upgrade, it is customary for the operator to remove his foot from the accelerator in order to apply the brake, and on completing the stop to open the vehicle door to discharge or load passengers. The brakes must be held applied during this period, and on restarting vehicles of the type now in use the foot must be quickly shifted from the brake pedal to the accelerator if the start is to be made smoothly and without allowing backward movement of the vehicle and consequent danger to following vehicles. This operation is tiring to the driver, and also involves the exercise of considerable skill, particularly in city vehicle operation where numerous stops are made and heavy traffic is encountered, and, since, during this period, the accelerator is normally in released position and the vehicle door is opened, means are provided by the present invention for energizing the auxiliary brake valve under the control of means operable by release of the accelerator and by operation of the door control mechanism to open the vehicle door. While these two controls might in ordinary cases be sufficient for the purpose of controlling a brake application by the auxiliary brake valve, there is always a possibility that the driver may inadvertently open the vehicle door when traveling at a considerable speed, whereupon release of the accelerator pedal might cause a very severe brake application dangerous to the passengers, and, as a further safeguard against such a contingency, additional control means are provided wherein the fluid pressure in the brake system during a service brake application controls the operation of the auxiliary brake valve, making it impossible for the driver to effect an auxiliary brake application without first making a service brake application, during which release of the accelerator and opening of the vehicle door will insure operation of the auxiliary brake valve to effect and maintain a brake application, which can be released only by subsequent depression of the accelerator pedal.

Relatively simple and inexpensive mechanism is provided for accomplishing this desirable end, and, referring again to the drawing, it will be noted that this mechanism includes a pair of switches 41 and 42 having normally closed and open contacts respectively, connected electrically in series relationship with a suitable battery 43 and with the electro-pneumatic valve 36, and operable respectively by accelerator pedal 7 through rod 9, clamp 44 and resilient connection 45 and by the fluid pressure in the auxiliary brake control system through a conduit 46 connected at one end to conduit 39 and at the other end to switch 42. A return connection between the switches is effected by ground wires 47 and 48 grounded on the vehicle, the other side of the electrical circuit comprising a conductor 49 between switch 41 and battery 43, conductor 50 connected between the battery and the electro-pneumatic valve 36, and conductor 51 connected between the electro-pneumatic valve 36 and switch 42, the contacts of the two switches acting when closed to establish a complete circuit for energizing the magnet valve. In order that the control heretofore described may be made fully effective, a second pair of pressure responsive serially connected switches 52 and 53, having normally open contacts, are provided, switch 52 being actuated by fluid pressure from the door control system through conduit 54 connected to conduit 37, and switch 53 being actuated by fluid pressure from the service brake system through a conduit 55 having a connection with conduit 17. These switches are connected electrically by a conductor 56 and, by means of conductor 57 connected between switch 52 and conductor 51 and conductor 58 connected between switch 53 and a ground on the vehicle, are placed electrically in series relationship with switch 41, battery 43 and electro-pneumatic valve 36, and in parallel relationship with switch 42, the result being that closing of switches 52 and 53 on closing of switch 42 will serve to complete the electrical circuit through electro-pneumatic valve 36 whenever the accelerator 7 is released to close switch 41. In amplification of the foregoing description, reference is had to the patent to Wilfred A. Eaton, No. 2,141,689, dated December 27, 1938, for a more complete disclosure of devices equivalent to those used in the present invention, such as brake valve 15, double check valve 18, electro-pneumatic valve 36, and pressure responsive switches 42, 52 and 53. The brake valve 15 double check valve 18, and electro-pneumatic valve 36, of the present application, are respectively similar to the devices 8, 75 and 40 shown in Figure 1 of the above referred to Eaton patent, while the pressure responsive switches 42, 52 and 53 may correspond to the switch 58 in Figure 1 of the above patent.

It will be readily apparent from the foregoing description that, during a normal brake application, the service brake valve 15 will be effective to supply braking fluid to brake cylinder 13 through conduit 17, double check valve 18 and conduit 19, and to the pressure responsive switch 53 through conduits 17 and 55, but the resultant closing of switch 53 will not complete the circuit through electro-pneumatic valve 36 until switches 41 and 52 are closed by subsequent release of the accelerator and opening of the vehicle door, so that all of the three above mentioned switches must be closed to effect energization of the electro-pneumatic valve 36. This condition normally exists when the driver stops the vehicle by releasing the accelerator, making a service brake application, and then opening the vehicle door, whereupon switches 41, 52 and 53 complete the circuit through valve 36, which in turn connects conduits 37 and 39 to supply fluid under pressure from reservoir 38 to double check valve 18. When this action occurs, the service brake valve may be released and the fluid pressure in conduit 39 will operate the double check valve to disconnect conduits 17 and 19 and connect conduits 19 and 39, thus placing the brake cylinder 13 under the control of valve 36. It is desirable, however, to control the release of the brake application above described by the accelerator alone, and the switch 42 provides means for accomplishing this desirable control, this switch being closed by fluid pressure supplied from valve 36 through conduits 39 and 46, and acting in cooperation with switch 41 to maintain the circuit between the battery 43 and valve 36 regardless of subsequent operation of the door control mechanism and service brake control systems with a resulting opening of switches 52 and 53.

While an embodiment of the invention illustrated in the drawing has been described with considerable particularity, it is to be understood that the invention is not restricted thereto, but is capable of receiving a variety of expressions, some of which will now readily suggest themselves to those skilled in the art, while changes may be made in the details of construction and arrangement of parts, and certain features used without other features, without departing from the spirit of the invention. Reference is, therefore, to be had to the claims hereto appended for a definition of the limits of the invention.

What is claimed is:

1. The combination in a motor vehicle having service brake controlling means for applying and releasing the brakes, door controlling means and controlling means for the vehicle motor, of power means controlled by all of said means for applying and holding the brakes applied and controlled by said third named means for releasing the brakes.

2. The combination in a motor vehicle having service brake controlling means, door controlling means and an accelerator for controlling the speed of the vehicle motor, of power means controlled by said first two means and accelerator for effecting a power application of the brakes and controlled by said accelerator only for releasing said power brake application.

3. The combination in a motor vehicle having service brake controlling means, door controlling means and an accelerator for controlling the speed of the vehicle motor, of power means controlled by said first two means and accelerator and effective during a service brake application for rendering the power means effective to apply the brakes and to hold the brakes applied during subsequent operation of the first two means, and controlled by said accelerator for releasing said power brake application.

4. The combination in a motor vehicle having a fluid pressure brake actuator and control means therefor, door controlling means and an accelerator for controlling the speed of the vehicle motor, of auxiliary brake actuator control means responsive to a predetermined operation of said first two named means and accelerator for rendering said actuator operative to effect and maintain a brake application, and responsive to operation of said accelerator independent of said first two named means for releasing said brake application.

5. In a fluid pressure brake system for a motor vehicle having door controlling means and throttle controlling means for the vehicle motor, a source of fluid pressure, a brake actuator, means including a service brake valve for controlling the flow of fluid to and from said actuator for applying and releasing the brakes, an auxiliary brake valve having connections with said source and actuator for controlling the flow of fluid to and from said actuator, and means controlled by said first two named means and service brake valve for operating said auxiliary brake valve to supply fluid pressure to said actuator and controlled by operation of said throttle control means for operating said auxiliary valve to release fluid pressure from said actuator.

6. The combination in a motor vehicle having a fluid pressure brake actuator and control means therefor, door controlling means, an accelerator for controlling the speed of the vehicle motor and auxiliary brake actuator control means including an electro-pneumatic brake valve, of means operable in response to predetermined controlling of said first two named means and accelerator for energizing said electro-pneumatic valve to effect and maintain a brake application, and responsive to operation of said accelerator independent of subsequent operation of said first two named means for releasing said brake application.

7. In a fluid pressure brake system for a motor vehicle having door controlling means and throttle controlling means for the vehicle motor, a source of fluid pressure, a brake actuator, means including a service brake valve for controlling the flow of fluid to and from said actuator for effecting an application and release of the brakes, an electro-magnetically operated auxiliary brake valve having connections with said source and actuator for controlling the flow of fluid to and from said actuator, and means including switches controlled respectively by operation of said first two named means, service brake valve and auxiliary brake valve for energizing said valve to supply and continue to supply fluid to said actuator and controlled by said throttle controlling means only for deenergizing said auxiliary brake valve to release fluid from said actuator.

8. The combination in a motor vehicle having service brake controlling means for applying and releasing the brakes, door controlling means and controlling means for the vehicle motor, of means controlled by all of said means for applying and holding the brakes applied and controlled by said third named means for releasing the brakes.

9. The combination in a motor vehicle having service brake controlling means for applying and releasing the brakes, door controlling means and controlling means for the vehicle motor, of auxiliary brake applying means controlled by said second and third named means for effecting a brake application, and means controlled by operation of the first named means for preventing the operation of said auxiliary means for effecting a brake application.

10. The combination in a motor vehicle having service brake controlling means, auxiliary brake controlling means, door controlling means and means for controlling the vehicle motor, of means controlled by the operation of said service brake controlling means, door controlling means and motor speed controlling means for controlling the operation of said auxiliary means to effect a brake application, and control means operated by the brake applying action of the auxiliary means for holding the brakes applied and preventing the release thereof by subsequent operation of said service brake controlling means and said door controlling means.

WILFRED A. EATON.